United States Patent [19]

Matsuda et al.

[11] Patent Number: 5,576,558
[45] Date of Patent: Nov. 19, 1996

[54] PRIMER COMPOSITION CONTAINING POLYISOCYANATE AND PHOSPHATE FOR BONDING TO A HARD-TO-BOND MATERIAL

[75] Inventors: Hideyuki Matsuda, Fujisawa; Yoshinobu Ohashi, Yokohama; Masamichi Danjo, Hadano, all of Japan

[73] Assignee: The Yokohama Rubber Co., Ltd., Japan

[21] Appl. No.: 352,172

[22] Filed: Dec. 1, 1994

Related U.S. Application Data

[63] Continuation-in-part of Ser. No. 63,430, May 19, 1993, abandoned.

[30] Foreign Application Priority Data

May 21, 1992 [JP] Japan .................................. 4-128828

[51] Int. Cl.$^6$ ................ C08K 3/32; C08K 3/34
[52] U.S. Cl. .................... 252/182.2; 252/389.2; 252/389.24
[58] Field of Search ................ 524/710, 711; 528/51, 72, 71; 252/182.2, 389.2, 389.24

[56] References Cited

U.S. PATENT DOCUMENTS 4,093,674  6/1978  Tostsui et al. .
4,435,219  3/1984  Greigger .
4,555,561  11/1985  Sugimori et al. .
4,857,364  8/1989  von Bonin .

FOREIGN PATENT DOCUMENTS 57-165461  10/1982  Japan .
2-235978   9/1990   Japan .
4149278    5/1992   Japan .

OTHER PUBLICATIONS

Derwent Abstract of JP 61-152755 (Nov. 7, 1986).

*Primary Examiner*—Jeffrey C. Mullis
*Attorney, Agent, or Firm*—Finnegan, Henderson, Farabow, Garrett and Dunner, L.L.P.

[57] ABSTRACT

A primer composition containing:
(a) at least one polyisocyanate component selected from 4,4'-diphenylmethane diisocyanate, tolylene diisocyanate, xylene diisocyanates, hexamethylene diisocyanate, hydrogenated 4,4'-diphenylmethane diisocyanate, hydrogenated tolylene diisocyanates, hydrogenated xylene diisocyanates, isophorone diisocyanate, aromatic aliphatic polyisocyanates, aromatic polyisocyanates, triphenylmethane triisocyanates, and tris(p-isocyanatophenyl) thiophosphate, polymeric diphenylmethane diisocyanates and mixtures thereof; and
(b) at least one phosphate component selected from aluminum phosphate, zinc phosphate, and aluminum dihydrogentripolyphosphate, wherein the phosphate is treated with a Si compound, a Zn compound or a mixture thereof.

10 Claims, No Drawings

PRIMER COMPOSITION CONTAINING POLYISOCYANATE AND PHOSPHATE FOR BONDING TO A HARD-TO-BOND MATERIAL

CROSS-REFERENCE TO RELATED APPLICATION

This application is a continuation-in-part of Ser. No. 08/063,430, filed May 19, 1993, now abandoned.

BACKGROUND OF THE INVENTION

1. Field of the Invention

The present invention relates to a primer composition capable of providing a satisfactory adhesion property to a nonadhesible or hard-to-bond material such as polyolefin and high solid paint (i.e., highly corrosion-resistant paint).

2. Description of the Related Art

Recently, parts such as automobile parts heretobefore manufactured from steel materials are being substituted with resin products for the purpose of reducing the weight and cost thereof. Moreover, there has been increasing the proportion of a highly corrosion-resistant paint, namely, a so-called high solid paint, as paints for automobiles, etc.

Those materials having excellent corrosion-resistant properties, such as resins (e.g., polyolefin) and high solid paints, generally have poor adhesion properties, and it is difficult to obtain the good adhesibility (or adhesion properties) when conventional primers are used.

For this reason, attempts have been made to obtain good adhesibility when these hard-to-bond materials are bonded, by adding various additives to the primers. For example, Japanese Unexamined Patent Publication (Kokai) No. 61-152755 proposes a primer composition containing, for example, chlorinated polyolefin.

However, these proposed primer compositions are still not sufficient to provide the desired good adhesive properties to the hard-to-bond materials, and therefore, there is a need for such a primer composition that can bond hard-to-bond materials with good adhesivity.

SUMMARY OF THE INVENTION

Accordingly, the objects of the present invention are to solve the above-mentioned problems in the prior art and to provide a primer composition capable of providing a sufficient adhesivity even to hard-to-bond materials such as polyolefins and high solid paints.

Other objects and advantages of the present invention will be apparent from the following description.

In accordance with the present invention, there is provided a primer composition comprising:

(a) at least one polyisocyanate component selected from the group consisting of 4,4'-diphenylmethane diisocyanate, tolylene diisocyanate, xylene diisocyanates, hexamethylene diisocyanate, hydrogenated 4,4'-diphenylmethane diisocyanate, hydrogenated tolylene diisocyanates, hydrogenated xylene diisocyanates, isophorone diisocyanate, aromatic aliphatic polyisocyanates, aromatic polyisocyanates, triphenylmethane triisocyanates, and tris(p-isocyanatophenyl) thiophosphate, polymeric diphenylmethane diisocyanates and mixtures thereof; and (b) at least one phosphate component selected from the group consisting of aluminum phosphate, zinc phosphate, and aluminum dihydrogentripolyphosphate, said phosphate being treated with a Si compound, a Zn compound or a mixture thereof.

DESCRIPTION OF THE PREFERRED EMBODIMENTS

The primer composition of the present invention will now be illustrated in detail below.

The fundamental constitution of the primer composition according to the invention is the polyisocyanate component and the phosphate component.

The polyisocyanate components usable in the present invention include 4,4'-diphenylmethane diisocyanate (MDI), tolylene diisocyanate (TDI), xylene diisocyanates (XDI), hexamethylene diisocyanate (HMDI), hydrogenated MDI, hydrogenated TDI, hydrogenated XDI, isophorone diisocyanate (IPDI), aromatic aliphatic polyisocyanate (e.g., arylalkyl polyisocyanates), aromatic polyisocyanates (e.g., aryl polyisocyanates), triphenylmethane triisocyanates, tris(p-isocyanatophenyl) thiophosphate, polymeric diphenylmethane diisocyanates and mixtures thereof obtained by suitably mixing any above-mentioned compounds. The "polyisocyanate" used herein means a non-blocked polyisocyanate.

A combination of MDI, tris(p-isocyanatophenyl) thiophosphate and aromatic aliphatic isocyanates is preferably used.

The phosphates (or phosphoric acid salts) usable in the preparation of the phosphate component according to the present invention are, for example, aluminum phosphate, zinc phosphate, and aluminum dihydrogentripolyphosphate. Aluminum dihydrogentripolyphosphate is particularly preferably used in the present invention.

The above-mentioned phosphates can be treated with the Si and/or Zn compounds in conventional methods.

Examples of such methods are as follows.

The treatment of phosphates with Si compounds can be carried out as follows.

Aluminum or aluminium containing substances are dissolved in solutions of P-containing substances, followed by the addition of silicates. When the water is evaporated from the solution to precipitate aluminum dihydrogenphosphate containing the silicate. This opaque solid substance is heat treated at a temperature of 290°–400° C. to thereby convert the phosphate to silicon oxide to obtain aluminum dihydrogentripolyphosphate containing the silicon dioxide. The aluminum dihydrogentripolyphosphate having the silicon dioxide on the surface thereof is obtained. Examples of the silicates are metasilicic acid, sodium metasilicate, sodium orthosilicate, sodium tetrasilicate, sodium disilicate, barium metasilicate, lithium metasilicate, potassium metasilicate, potassium hydrogendisilicate, calcium metasilicate, etc.

The treatment of phosphate with Zn compounds can be carried out as follows.

The treatment with a Zn compound can be effected after obtaining aluminum dihydrogentripolyphosphate. As a treatment method, particles of aluminum dihydrogentripolyphosphate are dispersed in a solution containing a Zn ion and the Zn ion is deposited as the hydroxide on the surface of the particles of aluminum dihydrogentripolyphosphate by changing the pH of the solution from a weak acidic side to an alkaline side by amines. Thereafter, the zinc hydroxide on the surface was converted to zinc oxide by filtering, washing with water, drying and heat-treating.

The aluminum dihydrogentripolyphosphate used may be aluminum dihydrogentripolyphosphate treated with the Si compound. The substances capable of delivering a Zn ion for preparing a solution containing a Zn ion include zinc chloride, zinc hydroxide, zinc nitrate, zinc carbonate, zinc sulfate etc., phosphates treated with the Si or Zn compounds, particularly, aluminum dihydrogentripolyphosphate treated with a Si or Zn compound can provide extremely excellent adhesive properties, and more preferable results can be obtained therefrom.

After the treatment, Si and/or Zn components are included in or coated on the particles of the phosphates by, for example, adsorption or absorption. The phosphates treated with the Si compounds and with the Zn compounds can be used alone or in any mixtures thereof. Furthermore, phosphates subjected to a conventional dehydrating treatment are preferred in the present invention.

In the primer composition of the present invention, there is no particular limitation as to the amount ratio of the phosphate component to the polyisocyanate component. The ratio may be suitably determined according to the types of the polyisocyanate component and the phosphate component. The phosphate component is usually used in an amount of about 5 to 100 parts by weight, more preferably 30 to 60 parts by weight, based on 100 parts by weight of the polyisocyanate component.

When the phosphate component is used in the amount as defined above, based on the polyisocyanate component, the effect of adding the phosphate component can be sufficiently obtained, and the phosphate component can be appropriately dispersed in the primer composition to provide the good adhesive properties.

Furthermore, more preferable results for, for example, the percent cohesive failure of adhesive can be obtained by using the phosphate component in an amount of 30 to 60 parts by weight, based on 100 parts by weight of the polyisocyanate component.

The primer composition of the present invention may include, if necessary, various solvents, especially organic solvents.

Any conventional solvents inactive to an isocyanate group are usable in the present invention. Typical examples of the solvent usable in the present invention include ethyl acetate, methyl ethyl ketone (MEK), acetone and toluene.

The amount of the solvent added is appropriately determined according to, for example, the type of the polyisocyanate compound, and is not specifically restricted. Preferably, the amount is 500 to 1000 parts by weight, more preferably 600 to 800 parts by weight, based on 100 parts by weight of the polyisocyanate component.

Furthermore, according to the present invention, various catalysts may be used in combination with the primer composition.

Examples of the catalyst usable in the present invention include amine catalysts such as triethylenediamine, pentamethylenediethylenetriamine, morpholine type amine and triethylamine, and tin catalysts such as di-n-octyltin dilaurate, dibutyltin dilaurate and stannous octoate.

The amount of the catalyst added in the present invention is preferably determined according to, for example, the type of the polyisocyanate compound, and is not specifically limited. The amount is preferably about 0.1 to 1 part by weight, more preferably 0.2 to 0.5 parts by weight, based on 100 parts by weight of the polyisocyanate component.

In the primer composition of the present invention, there may be used, in combination, urethane resin such as polyester polyurethane resin and polyether polyurethane resin, polyester resin, and the like to obtain good working or processing properties. The amount of these resins added are not specifically restricted, but it is preferably 10 to 30 parts by weight, based on 100 parts by weight of the polyisocyanate component.

Furthermore, a dehydrating agent inactive to isocyanate groups, such as synthetic zeolite may be used in combination for securing the stability of the primer composition.

The primer composition of the present invention can be prepared by any various known methods for sufficiently mixing each of the components, for example, by mixing the components by a ball mill.

The primer composition according to the present invention may be used in the same manner as conventional isocyanate based primer compositions. The area or region to be bonded may be coated therewith by spraying, dried by allowing the area to stand for a suitable period of time, and bonded the area by a conventional method.

Examples of adhesives applicable to the primer composition of the present invention include urethane adhesives and epoxy adhesives.

Since the primer composition of the present invention as described above exhibits extremely good improvement in adhesive properties compared with conventional primer compositions, it can be extremely effectively utilized as a primer coating for effectively bonding between adhesive-resistant materials such as polyolefins (e.g., polyethylene and polypropylene), and high solid paints.

EXAMPLES

The present invention will now be further illustrated by, but is by no means limited to, the following Examples.

EXAMPLES 1–4 AND COMPARATIVE EXAMPLES 1 AND 2

Various materials listed below were provided to prepare primer compositions.

Polyisocyanate component:

a. MDI b. tris(p-isocyanatophenyl) thiophosphate (Desmodur HL, manufactured by Bayer Ltd.)

c. aromatic aliphatic isocyanate (Desmodur RFE, manufactured by Bayer Ltd.)

The mixture of the above-mentioned isocyanate compounds with a molecular ratio of a:b:c being equal to 2:2:6

| | |
|---|---|
| Solvent: | ethyl acetate |
| Carbon black: | thermal carbon black |
| Desiccant: | synthetic zeolite |
| Catalyst: | di-n-octyl dilaurate |
| Polyurethane resin: | Pandex T 5205 (manufactured by Dainippon Ink K.K.) |
| Phosphate component a: | aluminum |
| dihydrogentripolyphosphate (K-WHITE #84S, treated with Si and Zn compounds, manufactured by TAYCA Corporation) | |
| Phosphate b: | aluminum |
| dihydrogentripolyphosphate ($AlH_2P_3O_{10}.2H_2O$) | |

The above-mentioned materials were mixed in ratios (ratios by weight) listed in Table 1 below to give various primer compositions. The mixing was effected at room temperature for 48 hours by a ball mill.

Polypropylene containing 40% by weight of glass fibers and a high solid paint for automobiles (with which a steel sheet was coated) were bonded together, as samples to be bonded, by using a primer prepared mentioned above and a one-pack type urethane adhesive (WS-100, manufactured by Yokohama Rubber Co., Ltd.).

The bonding was conducted as follows. Namely, both samples to be bonded each having a width of 25 mm and a thickness of 5 mm were coated with the above-mentioned primer composition, and after drying, were coated with the adhesive, followed by bonding together, by overlapping them at a width of 10 mm, and allowed to stand at a temperature of 20° C. and a relative humidity (RH) of 55% for 7 days.

The shear strength (kgf/cm$^2$) and percent cohesive failure of adhesive of the bonded samples were measured by pulling both samples in the directions reverse to each other at a rate of 50 mm/min according to JASO M338-89.

The kinds of samples to be bonded and phosphates used, and the measured results as to the shear strength and percent cohesive failure of adhesive are listed in Table 1. In addition, the polypropylene and high solid paint for automobiles used as the samples are designated by "PP" and "Paint", respectively, in Table 1.

TABLE 1

|  | Example | | | | Comparative Example | |
| --- | --- | --- | --- | --- | --- | --- |
| No. | 1 | 2 | 3 | 4 | 1 | 2 |
| Polyisocyanate component | 100 | 100 | 100 | 100 | 100 | 100 |
| Solvent | 750 | 750 | 750 | 750 | 750 | 750 |
| Carbon Black | 100 | 100 | 100 | 100 | 100 | 100 |
| Desiccant | 15 | 15 | 15 | 15 | 15 | 15 |
| Catalyst | 0.3 | 0.3 | 0.3 | 0.3 | 0.3 | 0.3 |
| Polyurethane resin | 15 | 15 | 15 | 15 | 15 | 15 |
| Phosphate a | 5 | 30 | 60 | 30 | 0 | 0 |
| Phosphate b | 0 | 0 | 0 | 0 | 30 | 0 |
| Sample | PP | PP | PP | Paint | PP | PP |
| Shear Strength (kgf/cm$^2$) | 15 | 38 | 30 | 68 | 15 | 11 |
| % Cohesive Failure of Adhesive | 5 | 50 | 20 | 100 | 10 | 0 |

As is clear from the results shown in Table 1, the hard-to-bond materials such as polypropylene and high solid paint for automobiles which have heretofore been incapable of being satisfactorily bonded with conventional primers can be effectively bonded together to exhibit good adhesion by the use of the primer composition according to the present invention.

EXAMPLES 5–8

The primer compositions of Examples 5–8 were prepared and evaluated in the same manner as in Examples 1–4 by using different phosphate components c, d and e, which were prepared as follows.

1) Preparation of aluminum dihydrogentripolyphosphate treated with Si compound

To one liter of 0.6 mol/L aqueous phosphoric acid solution at 90° C., 0.1 mol of aluminum hydroxide was dissolved to prepare the solution having a P$_2$O$_5$/Al$_2$O$_3$ mol ratio of 6. To this solution, 0.005 mol of sodium metasilicate was added, followed by stirring at a temperature of 90° C. for 10 hours. The water content of the solution was vaporized at a temperature of 95° C. to obtain an opaque solid substance. The solid opaque substance was washed with water, followed by heat treatment at 300° C. in a dryer. The dried product was powdered to obtain about 200 g of aluminum dihydrogentripolyphosphate treated with silicon oxide (i.e., phosphate c).

2) Preparation of aluminum dihydrogentripolyphosphate treated with Zn compound

To a solution of 0.01 mol of zinc chloride in one liter of ion-exchanged water dissolved at 80° C., 300 g of particles of aluminum dihydrogentripolyphosphate was added and dispersed therein. Thereafter, a pH of the solution was adjusted to 6.8 by the addition of isobutylamine, followed by stirring at a temperature of 80° C. for one hour. Thereafter, the resultant mixture was filtered, washed with water, and heat-treated at a temperature of 300° C. in a dryer, followed by powdering to obtain about 300 g of aluminum dihydrogentripolyphosphate treated with zinc oxide (i.e., phosphate d).

3) Preparation of aluminum dihydrogentripolyphosphate treated with Si and Zn compounds To a solution of 0.01 mol of zinc chloride dissolved in 1 liter of ion-exchanged water at 80° C., 300 g of the particles of aluminum dihydrogentripolyphosphate treated with the Si compound in the same manner mentioned above was added, followed by adding isobutylamine to adjust a pH of the solution to 6.8. The solution maintained at a temperature of 80° C. was stirred for one hour. Thereafter, the solution was filtered, washed with water and heat-treated at a temperature of 300° C. in a dryer, followed by powdering to obtain about 300 g of aluminum dihydrogentripolyphosphate treated with silicon oxide and zinc oxide (phosphate e).

4) Evaluation of Primer containing the above-mentioned phosphates

The primer compositions having the compositions listed in Table 2 were prepared and evaluated in the same manner as in Examples 1–4. The results are shown in Table 2.

TABLE 2

|  | Example | | | |
| --- | --- | --- | --- | --- |
| No. | 5 | 6 | 7 | 8 |
| Polyisocyanate component*[1] | 100 | 100 | 100 | 100 |
| Solvent*[1] | 750 | 750 | 750 | 750 |
| Carbon black*[1] | 100 | 100 | 100 | 100 |
| Desiccant*[1] | 15 | 15 | 15 | 15 |
| Catalyst*[1] | 0.3 | 0.3 | 0.3 | 0.3 |
| Polyurethane resin*[1] | 15 | 15 | 15 | 15 |
| Phosphate c | 30 | — | — | — |
| Phosphate d | — | 30 | — | — |
| Phosphate e | — | — | 30 | 30 |
| Sample*[1] | PP | PP | PP | Paint |
| Shear Strength (kgf/cm$^2$)*[1] | 21 | 35 | 40 | 62 |
| % Cohesive failure of adhesive*[1] | 10 | 45 | 50 | 100 |

*see Examples 1–4.

The effect of the present invention is clear from the aforementioned results.

As illustrated in detail above, hard-to-bond materials such as polyolefins and high solid paint can be bonded to exhibit adequate adhesion by the use of the primer composition according to the present invention. The primer composition of the present invention can therefore be suitably applied to, for example, the automobile industry, building industry, electronic and electric industry.

We claim:

1. A primer composition comprising:
   (a) at least one non-blocked polyisocyanate component selected from the group consisting of 4,4'-diphenylmethane diisocyanate, tolylene diisocyanate, xylene diisocyanates, hexamethylene diisocyanate, hydrogenated 4,4'-diphenylmethane diisocyanate, hydrogenated tolylene diisocyanates, hydrogenated xylene diisocyanates, isophorone diisocyanate, aromatic aliphatic polyisocyanates, aromatic polyisocyanates, triphenylmethane triisocyanates, and tris(p-isocyanatophenyl) thiophosphate, polymeric diphenylmethane diisocyanates and mixtures thereof; and (b) at least one phosphate component selected from the group consisting of aluminum phosphate, zinc phosphate, and aluminum dihydrogentripolyphosphate, said phosphate having silicon dioxide, zinc oxide or a mixture thereof on the surface of the phosphate.

2. A primer composition as claimed in claim 1, wherein said phosphate component is aluminum dihydrogentripolyphosphate.

3. A primer composition as claimed in claim 1, wherein the amount of the phosphate component is 5 to 100 parts by weight, based on 100 parts by weight of the polyisocyanate component.

4. A primer composition as claimed in claim 3, wherein the amount of the phosphate component is 30 to 60 parts by weight.

5. A primer composition as claimed in claim 1, wherein a solvent is further included in the composition.

6. A primer composition as claimed in claim 1, wherein the amount of the solvent is 500 to 1000 parts by weight, based on 100 parts by weight of the polyisocyanate component.

7. A primer composition as claimed in claim 1, wherein a catalyst is further included in the composition.

8. A primer composition as claimed in claim 7, wherein the amount of the catalyst is 0.1 to 1 part by weight, based on 100 parts by weight of the polyisocyanate component.

9. A primer composition as claimed in claim 1, wherein a carbon black is further included.

10. A method for improving the adhesion to a hard-to-bond material by applying thereto a primer composition according to claim 1.

* * * * *